United States Patent
Hakobyan et al.

(10) Patent No.: US 11,422,232 B2
(45) Date of Patent: Aug. 23, 2022

(54) MIMO RADAR SYSTEM

(71) Applicant: Robert Bosch GmbH, Stuttgart (DE)

(72) Inventors: Gor Hakobyan, Stuttgart (DE); Markus Gonser, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 17/172,638

(22) Filed: Feb. 10, 2021

(65) Prior Publication Data
US 2021/0270934 A1 Sep. 2, 2021

(30) Foreign Application Priority Data
Feb. 27, 2020 (DE) .................... 102020202499.5

(51) Int. Cl.
| | |
|---|---|
| *G01S 7/35* | (2006.01) |
| *G01S 13/58* | (2006.01) |
| *G01S 13/02* | (2006.01) |

(52) U.S. Cl.
CPC ............ *G01S 7/354* (2013.01); *G01S 13/584* (2013.01); *G01S 7/356* (2021.05); *G01S 2013/0263* (2013.01)

(58) Field of Classification Search
CPC ........ G01S 7/354; G01S 13/584; G01S 7/356; G01S 2013/0263
USPC ........................................................ 342/108
See application file for complete search history.

(56) References Cited

U.S. PATENT DOCUMENTS

| | | | | |
|---|---|---|---|---|
| 4,574,311 | A | * | 3/1986 | Resnikoff ............ H04N 5/3728 348/319 |
| 4,720,637 | A | * | 1/1988 | Clark ..................... G02B 27/46 348/340 |
| 9,541,638 | B2 | * | 1/2017 | Jansen .................. G01S 13/878 |
| 9,835,723 | B2 | * | 12/2017 | Jansen .................. G01S 13/343 |
| 10,317,518 | B2 | * | 6/2019 | Warnick ............... H01Q 21/064 |
| 10,419,655 | B2 | * | 9/2019 | Sivan ..................... G06F 1/163 |

(Continued)

FOREIGN PATENT DOCUMENTS

| | | | |
|---|---|---|---|
| DE | 102014212284 A1 | 12/2015 | |
| WO | 2018076005 A1 | 4/2018 | |
| WO | WO-2020212569 A1 * | 10/2020 | ............... H04B 7/06 |

*Primary Examiner* — Bernarr E Gregory
*Assistant Examiner* — Nuzhat Pervin
(74) *Attorney, Agent, or Firm* — Norton Rose Fulbright US LLP; Gerard Messina (57) ABSTRACT

A MIMO radar system. The system includes a transmitter array, a receiver array, the antenna distances in one of the transmitter and receiver arrays being below the Nyquist limit for unambiguous angle measurements, but the antenna distances in the combination of the transmitter and receiver arrays being above this Nyquist limit. The system further includes a control and evaluation unit, which is designed to transmit via the transmitter array a sequence of transmit signals, which are subdivided into multiple measuring blocks, in each of multiple repeatedly implemented measuring cycles, a uniform multiplex scheme being applied within each measuring block and the multiplex schemes varying from measuring block to measuring block, carry out a Doppler estimation and an angle estimation based on the receiver array, carry out a Doppler correction of the received signals based on the Doppler estimations, demultiplex the Doppler-corrected signals, and refine the Doppler estimations and angle estimations.

10 Claims, 5 Drawing Sheets

(56) References Cited

U.S. PATENT DOCUMENTS

| | | | |
|---|---|---|---|
| 10,627,483 B2* | 4/2020 | Rao | G01S 13/42 |
| 10,955,542 B2* | 3/2021 | Kishigami | H01Q 21/065 |
| 11,054,516 B2* | 7/2021 | Wu | G01S 7/354 |
| 11,099,267 B2* | 8/2021 | Wu | G01S 13/582 |
| 2010/0292568 A1* | 11/2010 | Droitcour | G01S 13/88 |
| | | | 600/425 |
| 2016/0131742 A1* | 5/2016 | Schoor | G01S 13/931 |
| | | | 342/128 |
| 2016/0131752 A1* | 5/2016 | Jansen | G01S 13/42 |
| | | | 342/27 |
| 2017/0160380 A1* | 6/2017 | Searcy | G01S 7/2921 |
| 2018/0011170 A1* | 1/2018 | Rao | G01S 13/42 |
| 2019/0137616 A1* | 5/2019 | Kishigami | G01S 13/42 |
| 2020/0025906 A1* | 1/2020 | Kesaraju | G01S 13/589 |
| 2020/0191939 A1* | 6/2020 | Wu | G01S 7/354 |
| 2020/0191940 A1* | 6/2020 | Wu | H04B 7/0413 |
| 2020/0233076 A1* | 7/2020 | Chen | G01S 7/4865 |
| 2021/0173042 A1* | 6/2021 | Wu | G01S 7/356 |

* cited by examiner

MIMO RADAR SYSTEM

CROSS REFERENCE

The present application claims the benefit under 35 U.S.C. § 119 of German Patent Application No. DE 102020202499.5 filed on Feb. 27, 2020, which is expressly incorporated herein by reference in its entirety.

FIELD

The present invention relates to a MIMO radar system, in particular, for motor vehicles.

BACKGROUND INFORMATION

Radar systems are used to an increasing extent in motor vehicles for detecting the vehicle surroundings and provide pieces of information about distances, relative velocities and direction angles of located objects, such as vehicles or obstacles, to one or to multiple safety functions or convenience functions, which relieve the driver during the driving of the motor vehicle or completely or partially replace the human driver. In these systems, MIMO (multiple input-multiple output) systems are increasingly used, in which multiple transceiver antennas are employed in order to achieve a high angle resolution.

PCT Application No. WO 2018/076005 A1 mentions various types of MIMO radar systems: transmitters and/or receivers may be situated at different positions. By using codes that are orthogonal relative to one another, it is possible to generate virtual channels. A time multiplexing method, TDMA (Time Division Multiple Access), or a frequency multiplexing method, FDMA, (Frequency Division Multiple Access) may be used for channel separation.

A MIMO radar measuring method is described in German Patent Application No. DE 10 2014 212 284 A1, in which a transmitted signal is ramp-shaped frequency modulated using a modulation pattern, in which sequences of ramps are assigned to different transmission switching states, which differ in the selection of the antenna elements used for transmitting, and are temporally interleaved with one another. In turn, multiple sequences, which are temporally interleaved with one another, are assigned to one transmission switching state. Based on a peak position in a two-dimensional spectrum of a signal obtained for a sequence, values for a relative velocity of a radar target are determined, which are periodic with a predetermined velocity period. Phase relationships of spectral values in the spectra for the sequences of a transmission switching state are compared with phase relationships expected for respective periodic values of the relative velocity, and an estimated value for the relative velocity is selected based on the comparison result.

U.S. Patent Application Publication No. US 2017/0160380 A1 describes a MIMO radar system, in which multiple transmitting antennas transmit simultaneously. With the aid of pseudo-random phase modulation (PRPM), the phase of a signal directed to a respective transmitting antenna is randomly varied in order to obtain a degree of orthogonality between the simultaneously emitted and received signals.

Digital modulation methods including multiple carrier frequencies are known as OFDM (orthogonal frequency division multiplex) methods. A use of OFDM methods for radar systems is being increasingly studied. In an OFDM method, the frequency band is divided into multiple orthogonal sub-bands or sub-carriers (FDM, frequency division multiplexing), and OFDM symbols are transmitted sequentially in succession. The transmitting signal of an OFDM symbol consists, according to one modulation scheme of the symbol, of modulated sub-carrier signals orthogonal relative to one another, which are transmitted simultaneously within the OFDM symbol period.

A MIMO radar system has already been provided by the applicant, in which the repetition rate of the multiplex sequences is below the Nyquist limit for unambiguous Doppler measurement, so that the results of the relative velocity measurements, though in fact high resolution, are ambiguous. To resolve this ambiguity, the provided method capitalizes on the fact that the demultiplex methods, with which signals that are able to be unambiguously assigned to the individual transmitting antennas of the transmitter array are reconstructed again from the received signals, provide results of high quality only if the phase offset caused by the Doppler effect is appropriately corrected. For this purpose, however, the relative velocity of the relevant object must be known. The ambiguity is resolved by testing the various ambiguity hypotheses and then selecting that hypothesis, which yields the signal with the highest quality measure during demultiplexing.

SUMMARY

An object of the present invention is to provide a MIMO radar system including a simply constructed antenna array, in which relative velocities and location angles of radar objects are able to be determined in a short measuring time and with high accuracy and a large uniqueness range.

This object may be achieved according to an example embodiment of the present invention by a MIMO radar system including:
  a transmitter array, which includes multiple transmitting antennas situated at a distance from one another in one angle resolution direction,
  a receiver array, which includes multiple receiving antennas situated at a distance from one another in the angle resolution direction,
  the antenna distances in one of the transmitter and receiver arrays being above the Nyquist limit for unambiguous angle measurements (spatial frequency below the Nyquist limit), but the antenna distances in the combination of the transmitter and receiver arrays being below this Nyquist limit (spatial frequency above the Nyquist limit), and including
  a control and evaluation unit, which is designed:
    to transmit via the transmitter array a sequence of transmit signals, which are subdivided into multiple measuring blocks, in each of multiple repeatedly implemented measuring cycles, a uniform multiplex scheme being applied within each measuring block and the multiplex schemes varying from measuring block to measuring block,
    to carry out in each measuring block a Doppler estimation and an angle estimation at the signals received in each measuring block on the basis of the receiver array,
    to carry out a Doppler correction of the received signals on the basis of the Doppler estimations,
    to demultiplex the Doppler-corrected received signals and
    to refine the Doppler estimations and angle estimations on the basis of the signals received in the various measuring blocks of the measuring cycle while taking the phases of the signals transmitted by various transmitting antennas into account.

With the aid of the present invention, the previously provided method is modified to the extent that an undersampling, i.e., a sampling below the Nyquist limit takes place not during the Doppler measurement, but during the angle measurement. For this purpose, either the aperture of the transmitter array or the aperture of the receiver array is selected in such a way that a high angle separability is achieved, in return for which, however, ambiguous results are obtained. In contrast, the aperture of the respective other array is selected in such a way that in the virtual array, which represents the various combinations of transceiver antennas, the gaps between the individual antennas are filled to the point that an unambiguous and yet high-resolution result is obtained.

However, the angle estimation on the basis of the virtual array makes it necessary to demultiplex the received signals, i.e., to reconstruct signals which may be unambiguously assigned to the individual transmitting antennas, for which purpose a correction of the phase progression caused by the Doppler effect is necessary.

One particular feature of the system provided herein is that the period duration with which the multiplex schemes are repeated is extended to the entire duration of the measuring cycle, and thus encompasses a plurality of measuring blocks. For the purposes of a high-resolution and unambiguous Doppler measurement, it is possible to combine the signals obtained in the various measuring blocks so that for a given total duration of the measuring cycle the measuring time available for an exact Doppler measurement is maximized. Accordingly, the relative velocities of the located objects may be determined with higher accuracy. Since these values form the basis for the Doppler correction, a higher signal quality is achieved when reconstructing the signals transmitted by the individual transmitting antennas (demultiplexing), as a result of which for a given complexity of the antenna array and for a given computing time during the signal evaluation, the accuracy of the measured results is improved overall.

Advantageous embodiments and refinements of the present invention result from the disclosure herein.

In view of the extended measuring period of the multiplex cycle, it may be advantageous to correct migration effects during the signal evaluation, which result from the change of the distances of the located objects during the extended measuring period. For that purpose, the coordinates that represent the relative velocity and the distance may be transformed in the multidimensional detection space for the signals obtained in the various measuring blocks in such a way that the signal peaks, which represent the estimated values for the distances and relative velocities of the located objects, occur at the same positions in all measuring blocks. This compensates for the migration effects in such a way that they have no detrimental effects when the signals obtained in the various measuring blocks are jointly evaluated.

In one specific embodiment of the present invention, the radar system is a FMCW or Chirp Sequence Radar, in which the frequency of the transmitted signals is modulated according to a sequence of steep frequency ramps, so-called chirps, the slope of which is so great that the Doppler effect on the ramp is negligible, and thus a pure propagation time measurement, i.e., a distance measurement, is carried out. The relative velocity is then measured by evaluating the phase offset from ramp to ramp caused by the Doppler effect.

In accordance with the MIMO principle, suitable multiplex methods and demultiplex methods are required, with which the signals transmitted by the various transmitting antennas may be separated from one another. Code multiplex methods and time multiplex methods, in particular, are considered here.

In a code multiplex method, the signals, which are simultaneously transmitted by the transmitting antennas, are coded with orthogonal or quasi-orthogonal codes, which are established in a code matrix. The distribution of the codes to various transmitting antennas remains unchanged within each measuring block, but differs from measuring block to measuring block.

If a complete measuring cycle includes, for example, nM measuring blocks, each of which predefines a different distribution of the codes to the transmitting antennas, the phases of the signals received in a single code block then form a vector including nM components. In the case of a quadratic code matrix, nM is equal to the number of the simultaneously transmitting antennas of the transmitter array. The received signal may then be decoded by multiplying the vector by the inverse of the code matrix. A prerequisite, however, is that the orthogonality of the coded signals is maintained during the reflection at the radar target or is at least able to be re-established. If the relative velocity of the radar target is different from zero, the Doppler effect results in a certain disruption of the orthogonality, with the result that the decoded signal for a given transmitting antenna also includes in each case a signal proportion that originates from other transmitting antennas.

Thus, in order to obtain measuring results having a high quality measure, the received signals must be corrected in accordance with the Doppler effect.

In another specific embodiment of the present invention, a time multiplex method may be used instead of a code multiplex method.

In that case, only one signal transmitting antenna of the transmitter array is active in each measuring block, and a switch is made measuring block by measuring block between the various transmitting antennas according to a periodic scheme. The order in which the individual antennas are activated is in this case generally not identical to the order in which the antennas are spatially situated in the transmitter array. A relative movement of the radar target therefore results in characteristic phase shifts between the signals received by various transmitting antennas, due to the time offset with which the signals have been transmitted, and these phase shifts are distinguishable from phase shifts that result via angle-dependent propagation time differences during signal emission at a particular angle relative to the normal angle of the transmitter array. In this case as well, the phase errors caused by the relative movement may be corrected based on the high-resolution Doppler measurements.

Specific embodiments of the present invention are also possible, which involve operating with a combination of code multiplex and time multiplex.

Similarly, specific embodiments are also possible, in which the code matrix is not quadratic. If the number of columns of the code matrix (code instances) is smaller than the number of transmitting antennas, an underdetermined equation system is then obtained during the decoding, which is solvable, however, with the aid of plausible additional assumptions (for example, regarding the number of simultaneously located radar targets). Conversely, an overdetermined equation system may be achieved if more code instances than transmitting antennas are present. In that case, a greater robustness of the ambiguity resolution, for example, with respect to signal noises or other interfering influences, is achieved.

In one specific embodiment of the present invention, the receiver array has a large, not completely filled aperture, so that the angle estimation on the basis of the receiver array is high-resolution but ambiguous, whereas the transmitter array has a completely filled but smaller aperture, and thus enables unambiguous angle measurements having lower resolution. In another specific embodiment, however, the transmitter array may also have the large aperture and the receiver array the smaller aperture.

BRIEF DESCRIPTION OF THE DRAWINGS

Exemplary embodiments are explained in greater detail below with reference to the figures.

DETAILED DESCRIPTION OF EXAMPLE EMBODIMENTS

Figure 1:
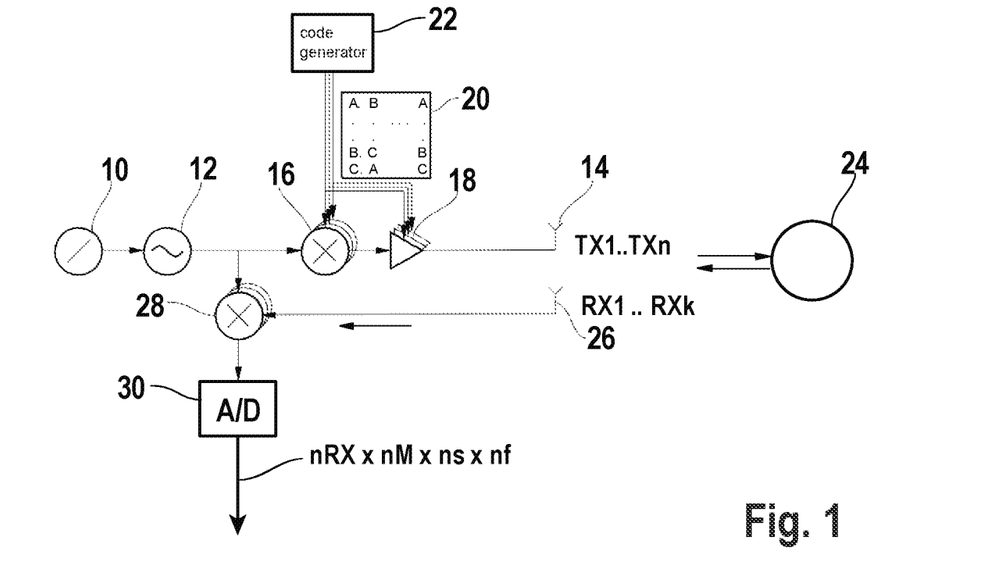
FIG. 1 schematically shows a representation of the analog portion of a MIMO radar system including a separate distance and velocity determination.

One exemplary embodiment of a Fast Chirp MIMO radar system is explained with reference to FIGS. 1 through 4 as an example of a FMCW-MIMO radar system, in which transmit signals are coded with the aid of phase modulation. FIG. 1 shows in a schematic and simplified manner the structure of the analog portion of the radar system.

A frequency modulation unit 10 controls a HF oscillator 12, which generates sequences of identical signals in the form of frequency ramps for multiple transmitting antennas 14. In each of the multiple transmission channels, a respective phase modulator 16, which is connected upstream from an amplifier 18, modulates the phases of the signals according to a respective code 20, which is generated by a code generator 22. The phase-modulated signal is emitted via one of transmitting antennas 14.

The signal transmitted and reflected at an object 24 is received by multiple receiving antennas 26 and mixed in each receiver channel by a mixer 28 with a proportion of the non-phase-modulated signal of HF oscillator 12 and brought into a low-frequency range. An A/D conversion by an A/D converter 30 then takes place in the conventional manner.

Figure 2:
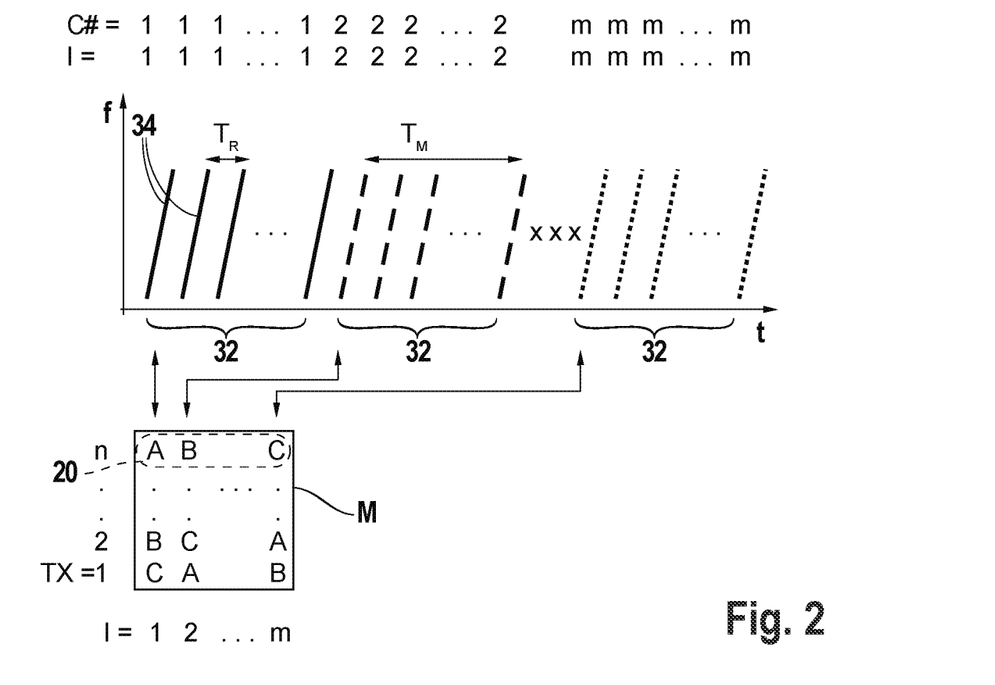
FIG. 2 shows diagrams of the frequency of FMCW transmit signals and of a modulation scheme of the transmit signals.

The frequency curve of the signals transmitted during a measuring cycle is schematically shown in FIG. 2. The measuring cycle is subdivided into a number of measuring blocks 32. A "fast chirp" frequency modulation scheme including a sequence of relatively "fast" frequency ramps 34 is used in such a way that distance and velocity may be evaluated essentially separately from one another, for example, with the aid of a two-dimensional Fourier transform. In particular, the Doppler shift within a ramp may be neglected. Each frequency ramp 34 has duration $T_R$.

According to FIG. 2, codes 20 for individual transmitting antennas 14 are established in a code matrix M. The code matrix assigns to each signal for an individual transmitting antenna a code value A, B, C, . . . of the relevant code 20. The individual code value defines a phase with which phase modulator 18 modulates the signal. Each column of the code matrix, also referred to as code instance 1, defines a code multiplex scheme, which assigns a particular code value to each of the transmitting antennas, and thus establishes a particular phase modulation. The number of the code instances corresponds to the number of the transmitting antennas that transmit simultaneously.

Within each measuring block 32, the code instance—and thus the multiplex scheme—remains unchanged, and a switch to the next code instance is made in each case when transitioning to the next measuring block. The number of code instances is equal to the number of measuring blocks 32 within a measuring cycle.

In the sequence of measuring blocks 32, the multiplex scheme runs through all code instances I=1, . . . , m of code matrix M. In the example shown in FIG. 2, measuring blocks 32 following one another continuously and have a uniform block duration $T_M$ corresponding to a clock rate $1/T_M$. An index C #=1 . . . m in FIG. 2 counts the measuring blocks, whereas an index TX=1 . . . n (n=m) numbers the transmitting antennas. Codes 20 of the code matrix are orthogonal (preferably perfectly orthogonal or alternatively quasi-orthogonal, i.e., small cross correlations between the codes) relative to one another. Thus, the signals of the individual transmitting antennas are coded by the codes; the transmitted signals are orthogonal relative to one another in order to enable a signal separation in the receiver channel.

In other specific embodiments, the measuring blocks may also be separated from one another by pauses of equal or of different length.

Figure 3:
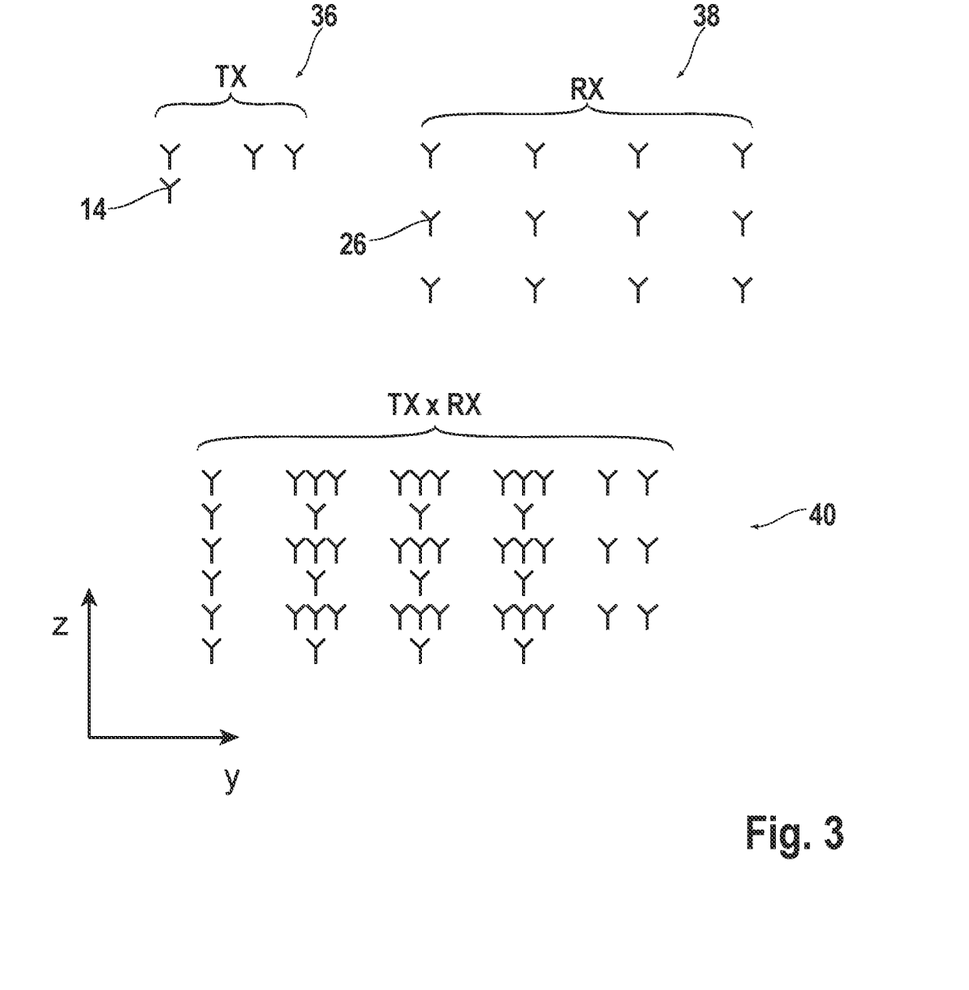
FIG. 3 shows a diagram of an antenna array of the radar system.

As shown in FIG. 3, transmitting antennas 14 form a transmitter array 36 and receiving antennas 26 form a receiver array 38. Both arrays in the example shown are two-dimensional, so that MIMO angle measurements are possible both in the azimuth and in elevation.

In receiver array 38, receiving antennas 26 are situated at uniform distances in an angle resolution direction y, for example, in the direction of the azimuth. The distances between the individual receiving antennas in this case are large enough that a large aperture and a correspondingly high angle resolution are achieved with just a few antennas. However, the distances from antenna to antenna in this case are greater than the half wavelength of the radar radiation, so that the Nyquist uniqueness criterion is not met.

Figure 4:
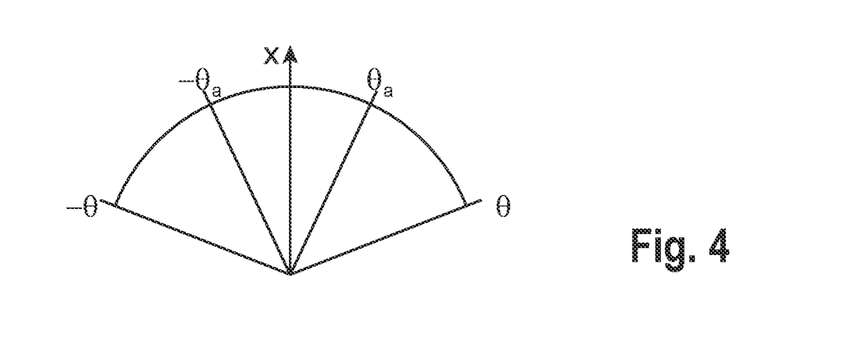
FIG. 4 shows a diagram of a location angle range of the radar system.

In FIG. 4, a field of view of the radar sensor is shown, which encloses angles from $-\theta$ to $+\theta$, as related to axis x, which is perpendicular to the plane of receiver array 38. The angle measurement results are unambiguous only when the location angle is within a significantly smaller interval from $-\theta_a$ to $+\theta_a$. If it is not possible to exclude larger location angles, then there are multiple angles for which the same phase relationships between the signals at the receiving antennas are obtained, so that the measurement is no longer unambiguous.

In the example shown in FIG. 3, receiving antennas 26 are also situated in elevation (in angle resolution direction z) at uniform distances, and in this direction as well, the antenna distances are large enough that a non-unambiguous undersampling takes place.

Transmitting antennas 14 of transmitter array 36 are situated in the azimuth at non-uniform distances, yet the distances are selected in such a way that an unambiguous angle measurement is possible. For this purpose, the aperture is significantly smaller than in the case of receiver array 38, so that the angle resolution is lower. In elevation as well, transmitter array 36 is designed with a smaller aperture for unambiguous angle measurements.

In FIG. 3, a synthetic array 40 is also shown, which is obtained when each of receiving antennas 26 is combined with each of transmitting antennas 14, so that the propagation time differences of the signals from the transmitting antennas to the object and from the object to the receiving antennas add up. Ultimately, it is the aperture of this virtual array 40, which determines the resolution capacity of the radar sensor. It is necessary, however, to separate from one another the signal proportions in the receive signal originating from the various transmitting antennas 14 so that the ambiguity of the receiver array may be resolved.

In the example shown in FIG. 3, the two angle resolution directions y and z are also decoupled from one another in receiver array 38, since for each y-position of the receiving antennas all z-positions are also occupied by receiving antennas. In contrast, transmitter array 36 is an example of a non-decoupled array, in which for some y-positions (the two right positions in FIG. 3) not all z-positions are occupied. In general, a decoupled array facilitates the data evaluation, whereas a non-decoupled array requires fewer antenna elements. The decision made between decoupled and non-decoupled arrays may be different for both the transmitting side as well as for the receiving side in accordance with the respective requirements.

The equidistant arrangement of the antenna elements (in the azimuth and/or in elevation) also facilitates the evaluation of the data, since they enable, for example, the use of a fast Fourier transform (FFT). On the other hand, the non-equidistant arrangement of the antennas, as in the case here of transmitting antennas 14, has the advantage that with a given aperture, the uniqueness angle range (FIG. 4) may be optimized.

In the radar system described herein, generally all combinations of equidistant and non-equidistant arrangement and decoupled or non-decoupled arrangement are possible. Similarly, specific embodiments are also possible, in which the transmitter array is designed for ambiguous high-resolution angle measurements, whereas the receiver array is designed for unambiguous angle measurements having a lower angle resolution.

One example of an evaluation unit for evaluating the received signals obtained with the antenna array according to FIG. 3 and in the multiplex scheme according to FIG. 2 is now explained with reference to FIG. 5.

The digital data provided from A/D converter 30 are each sampled over a complete measuring cycle. The number of all the (complex) signal values recorded in the measuring cycle is given by the product of the number nRX of receiving antennas 26 of receiver array 38, of the number nM of the measuring blocks, of the number ns of the repetitions of frequency ramps 34 within each measuring block, and of the number of of the sampling points on an individual frequency ramp 34. In one processing stage 42, the data sampled over the measuring cycle are subjected to a four-dimensional Fourier transform (4D-FFT). The result is a four-dimensional spectrum including the dimensions: "Azimuth1," "Elevation1," "Doppler1," and "Distance." The dimension "Azimuth1" indicates the distribution of the complex amplitudes across the location angle range in the azimuth, based on the data of receiving antennas 26, which are situated in the same row in the azimuth direction. The dimension "Elevation1" correspondingly indicates the distribution across the elevation angle range, based on the data of receiving antennas 26, which are situated in the same column in the elevation direction. The dimension "Doppler1" indicates the Doppler spectrum obtained by the "slow" sampling at the clock rate ns/$T_M$ (inverse of ramp duration $T_R$) of the frequency ramps. It should be noted that the results in all of the dimensions "Azimuth1" and "Elevation1" are ambiguous due to the respective undersampling. The results in the dimension "Doppler1" are unambiguous due to the selected clock rate, but have only a low resolution due to the relatively short duration of the individual measuring blocks. The dimension "Distance" indicates the distance spectrum, based on the "rapid" sampling on individual frequency ramps 34. The results in this dimension are also unambiguous. A unique spectrum is obtained for each transmitted ramp.

In the four-dimensional spectrum, each located radar target stands out as a peak at a particular coordinate position. If all radar targets relative to the radar sensor are at rest, the power spectra obtained for each of the successive measuring blocks are identical to one another. If, however, one of the radar targets has a non-vanishing relative velocity, a perceptible change of the distance of this object may result over the duration of the measuring cycle. A so-called migration effect then occurs, which results in the position of the distance coordinate of the peak in the spectrum shifting somewhat from measuring block to measuring block, the extent of the shift being a function of the relative velocity. This effect may be compensated for with comparatively little computing effort by shifting the distance coordinate in the distance velocity subspace in such a way that the migration of the radar target in the spectrum is reversed. The result of this correction is a set of spectra, in which all peaks occupy the same positions.

These corrected four-dimensional spectra may then be non-coherently integrated (addition of the absolute values of the complex amplitudes), without blurring the peaks. The result is an amplitude distribution in a four-dimensional detection space 44. Each point in this four-dimensional space is assigned a particular amount of the amplitude sum, and each located object stands out in this space in the form of a pronounced maximum with a particular distance, a particular Doppler shift, a particular azimuth angle and a particular elevation angle, the latter two variables being ambiguous in such a way that only one of multiple hypotheses relating to azimuth angle and elevation angle may be assigned to the object. In this detection space 44, the four-dimensional coordinates of the peaks found are then searched, each of which represents a detection result. For each of these points, there are (before the non-coherent integration) nM complex amplitudes, which form a vector including nM components and are then further evaluated in order to refine the measurement of the relative velocity and, at the same time, to resolve the remaining ambiguities in the angle measurement.

For this purpose, the amplitudes obtained for each detected object in a merging stage 46 are (coherently) added, so that a higher-resolution Doppler spectrum due to the measuring duration extend to the entire measuring cycle and, therefore, more exact results "Doppler2" for the relative velocities are obtained.

These more exact values may now be used to correct the phases occurring in the signal vector in accordance with the relative velocity. As a result, the orthogonality of the codes in the code instances is re-established, so that a correct decoding is possible and a decoded signal vector is obtained, whose components indicate in each case the phase for the signal that originates from one of transmitting antennas 14. Based on the components of this vector that belong to transmitting antennas 14 situated in the azimuth direction, it is then possible to determine an unambiguous (but low-resolution) value for the azimuth angle, and correspondingly, it is possible based on the components that belong to the transmitting antennas situated in the elevation direction to determine an unambiguous value for the elevation angle.

Based on these criteria, the ambiguities may now be resolved in a second detection stage 48. For this purpose, the phase-corrected and decoded signal vectors obtained in combining stage 46 are, for example, coherently added, to form a three-dimensional spectrum. This spectrum has the dimensions "Doppler2," "Azimuth2," and "Elevation2" and the sharpest (and highest) peak in this spectrum indicates the true and unambiguous values for the relative velocity, the azimuth angle, and the elevation angle of the object. Multiple targets in this 3D space may also be resolved in the same manner.

The results "Azimuth1" and "Elevation1" obtained in first detection stage 14 are high-resolution but ambiguous, whereas the results obtained in second detection stage 48 are low-resolution but unambiguous. These results may now be combined by selecting those values of the multiple high-resolution values for "Azimuth1" as the final and unambiguous value for the azimuth angle, which best agrees with "Azimuth2." The values for the elevation angle may also be combined in a similar manner.

When searching the spectrum for "Doppler2," "Azimuth2," and "Elevation2," it is possible to take advantage of the fact that based on the results for "Doppler1," "Azimuth1," and "Elevation1" already available, only relatively small areas of the detection space are considered, in which the searched values must be situated, so that the search may be limited to these areas.

Since each located object may have a different relative velocity, the calculations in merging stage 46 and in second detection stage 48 are carried out separately for each detection result obtained in detection space 44.

One particular advantage of the joint velocity and angle estimation results from the fact that the multidimensionality of the detection space results in an equalization of the individual peaks. If, for example, two radar targets have approximately the same relative velocity, the peaks, when considering only the dimension "Relative Velocity," will be difficult to separate. In the two-dimensional or three-dimensional detection space including the dimensions "Relative Velocity," "Azimuth," and "Elevation" on the other hand, the peaks will generally exhibit a significantly larger distance, so that they are easier to separate from one another in such a way that the comparatively small difference in the relative velocities then also becomes apparent and determinable.

The architecture of the radar system shown in FIG. 1 also allows for an alternative operating mode, in which the transmit signals are transmitted not in code multiplex, but in time multiplex. In that case, code generator 22 activates individual amplifiers 18 in such a way that at each point in time only one single transmitting antenna is active and a switch between the transmitting antennas is made in a particular order. These switches then separate the individual measuring blocks from one another. A coding of the transmit signals in this case is then not necessary, since the transmit signals are already separated from one another by being transmitted in a time-delayed manner. A phase correction of the received signals is nevertheless necessary even in time multiplex in order to compensate for the time delay between the signals transmitted successively by transmitting antennas 14. Like the phase correction for re-establishing the orthogonality in code multiplex, the phase correction in this case is also based on the results for the relative velocity determinable with high accuracy.

Similarly, an operating mode is also conceivable, in which code multiplex and time multiplex are combined with one another. In that case, transmitting antennas 14 are divided into groups, each of which transmits simultaneously and whose signals are coded with a correspondingly smaller code matrix.

Figure 5:
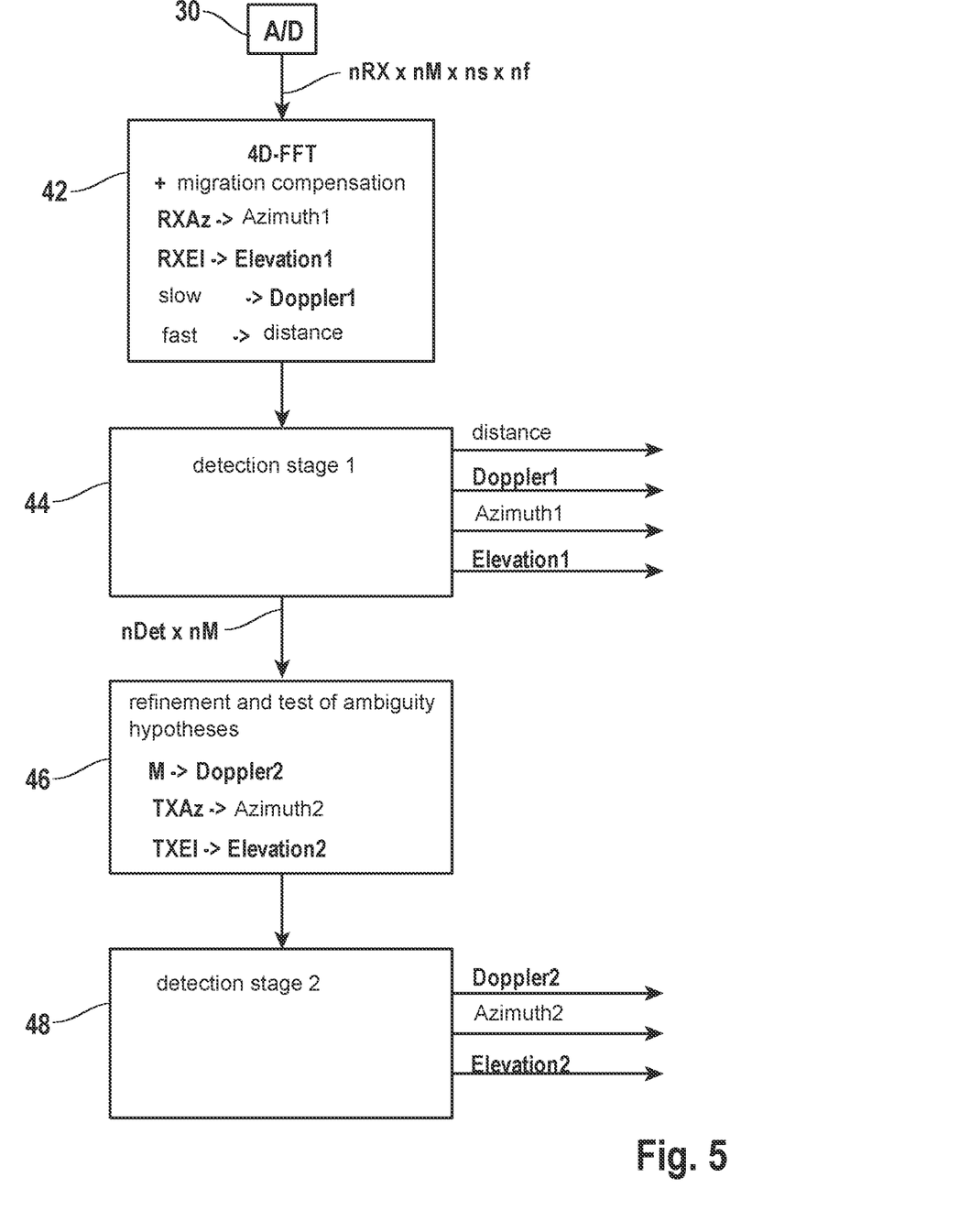
FIG. 5 shows a block diagram of a digital signal evaluation unit according to one specific embodiment of the present invention.

There are also various alternatives for the type of signal evaluation shown in FIG. 5.

Figure 6:
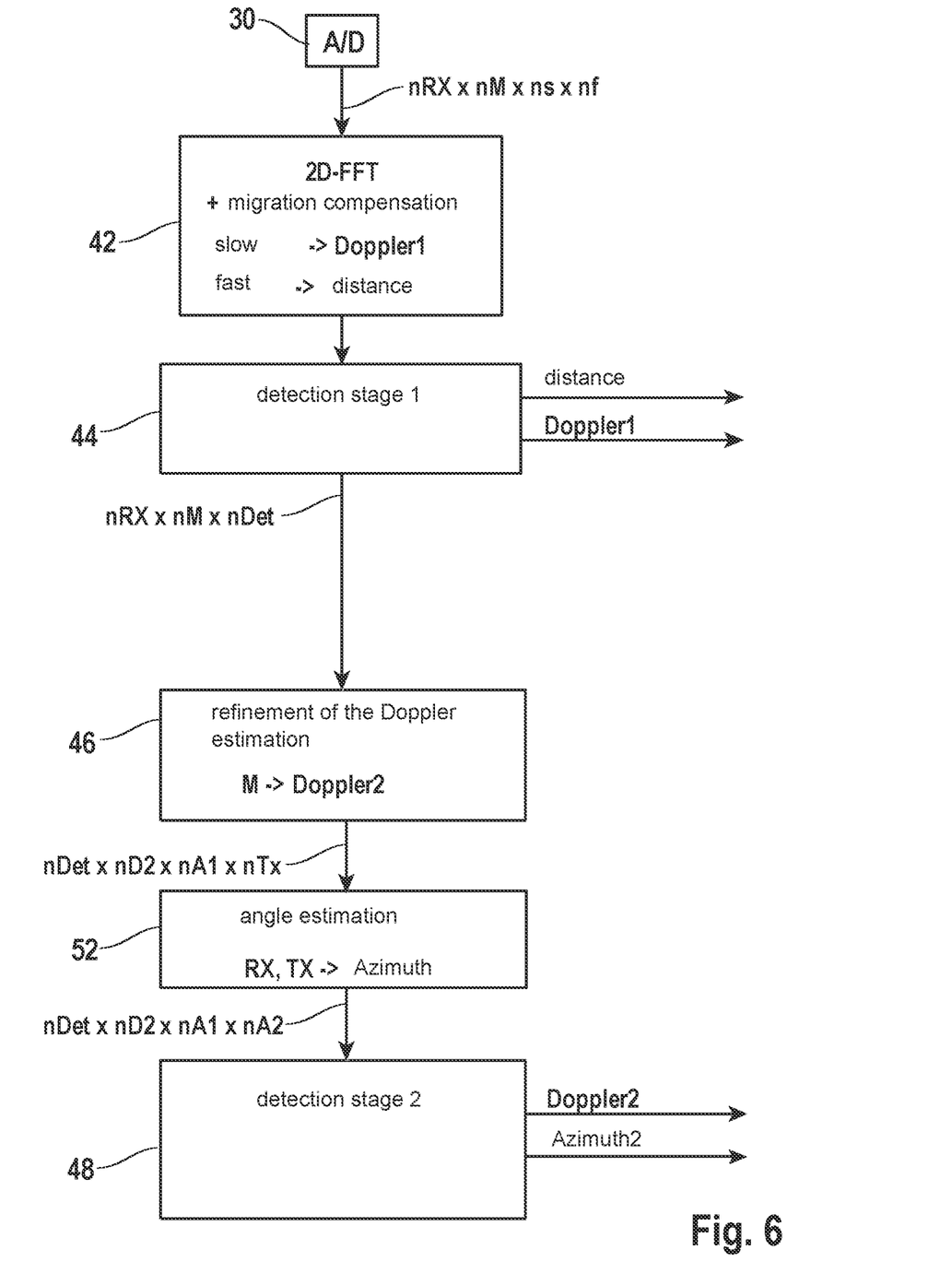
FIGS. 6 and 7 show block diagrams of digital signal evaluation units according to other specific embodiments of the present invention.

FIG. 6 shows an example in which the digital data sampled over a measuring cycle in processing stage 42 are initially only subjected to a two-dimensional Fourier transform, in the dimensions "Doppler1" and "Distance." Accordingly, the first detection stage provides for each object a value "Distance" and a low-resolution value "Doppler1" for the relative velocity.

In merging stage 46, the relative velocity measurements are refined on the basis of the signals of all measuring blocks, and the phase corrections for the respective relative velocities and subsequently the decoding of the phase-corrected signal vector then take place. In this way, a high-resolution value "Doppler2" for the relative velocity and a set of signals TX assigned to the simultaneously active transmitting antennas 14 are obtained. Based on these signals, an angle estimation then takes place in a second angle estimating stage 52 on the basis of transmitter array 36 and on the basis of receiver array 38, as a result of which unambiguous and high-resolution values "Azimuth" for the azimuth angle are obtained. In second detection stage 48, a two-dimensional spectrum in the dimensions "Doppler2," "Azimuth" is thus obtained for each detection result of the first stage.

Figure 7:
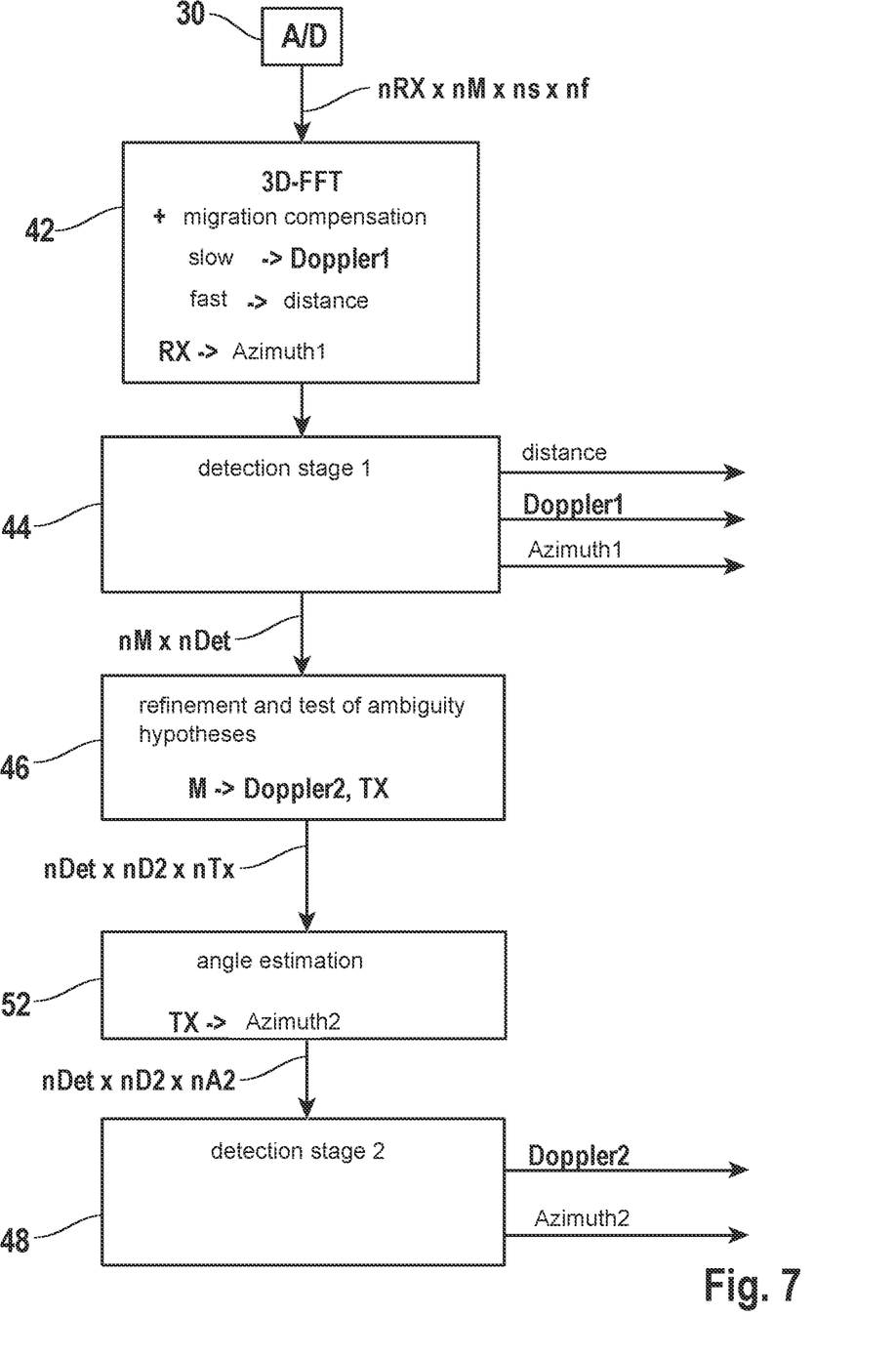

A further variant of the evaluation method is depicted in FIG. 7. In this method, a three-dimensional Fourier transform takes place in processing stage 42 in the dimensions "Doppler1," "Distance," and "Azimuth1," so that an unambiguous distance value, an ambiguous value "Doppler1" for the relative velocity, and ambiguous values "Azimuth1" are obtained in detection space 44. In merging stage 46, a phase correction and decoding then take place for each detection result. An angle is then estimated at the decoded signals in angle estimating stage 52 on the basis of transmitter array 36, so that an unambiguous value "Azimuth2" for the azimuth angle is obtained. This stage also provides higher-resolution values "Doppler2." In second detection stage 48, the peaks in a two-dimensional spectrum in the dimensions "Doppler2" and "Azimuth2" are then searched for each detection result, after which the detection results obtained in detection stages 44 and 48 in the previously described manner are then combined.

In one radar system, in which unlike in FIG. 3, the transmitter array has a large unfilled aperture and the receiver array has the smaller aperture, the described evaluation methods may also be applied, however, with interchanging roles for the transmitter array and the receiver array. In the case of the angle estimations, unambiguous but low-resolution values will then be obtained in the first step, and in the second step only the surroundings of these values need be searched in order to improve the accuracy.

What is claimed is:

1. A MIMO radar system, comprising:
a transmitter array which includes multiple transmitting antennas situated at a distance from one another in an angle resolution direction;
a receiver array which includes multiple receiving antennas situated at a distance from one another in the angle resolution direction, wherein antenna distances in one of the transmitter and receiver arrays being below a Nyquist limit for unambiguous angle measurements, and antenna distances in a combination of the transmitter and receiver arrays being above the Nyquist limit; and
a control and evaluation unit configured to:
transmit via the transmitter array a sequence of transmit signals, which are subdivided into multiple measuring blocks, in each of multiple repeatedly implemented measuring cycles, a uniform multiplex scheme being applied within each respective measuring block of the measuring blocks and the multiplex schemes varying from measuring block to measuring block;
carry out a Doppler estimation and an angle estimation for signals received in each of the measuring blocks based on the receiver array;
carry out a Doppler correction of the received signals based on the Doppler estimations;
demultiplex the Doppler-corrected received signals; and
refine the Doppler estimations and the angle estimations based on the signals received in the measuring blocks of the measuring cycle while taking phases of the signals transmitted by the transmitting antennas into account.

2. The radar system as recited in claim 1, wherein the control and evaluation unit is further configured to:
carry out separate distance measurements for a located object in each of the measuring cycles according to the measuring blocks; and
subject distance data obtained in the measuring blocks to a velocity-dependent coordinate transformation before the Doppler correction, to compensate for relative movements of the objects in an elapsed time between the measuring blocks.

3. The radar system as recited in claim 1, wherein the multiplex schemes include a code multiplex for at least some of the transmitting antennas.

4. The radar system as recited in claim 1, wherein the multiplex schemes include a time multiplex for at least some of the transmitting antennas.

5. The radar system as recited in claim 1, wherein the transmit signals include, within each of the measuring blocks, a sequence of frequency ramps whose ramp slope for a distance measurement is configured according to the FMCW principle.

6. The radar system as recited in claim 1, wherein the transmitter array is configured for unambiguous angle measurements in at least one angle dimension and the receiver array is configured for ambiguous higher-resolution angle measurements.

7. The radar system as recited in claim 1, wherein the receiver array is configured for unambiguous angle measurements in at least one angle dimension and the transmitter array is configured for ambiguous higher-resolution angle measurements.

8. The radar system as recited in claim 1, wherein the receiving antennas and/or the transmitting antennas are situated equidistantly in the angle resolution direction.

9. The radar system as recited in claim 1, wherein the angle estimation takes place based on the receiver array separately from an angle estimation based on the transmitter array.

10. The radar system as recited in claim 9, wherein the receiving antennas are situated equidistantly in the angle resolution direction and the angle estimation takes place based on the receiver array via a fast Fourier transform.

* * * * *